(12) United States Patent  
Brooker et al.

(10) Patent No.: US 10,200,301 B1  
(45) Date of Patent: Feb. 5, 2019

(54) LOGICAL CONTROL GROUPS FOR DISTRIBUTED SYSTEM RESOURCES

(71) Applicant: Amazon Technologies, Inc., Reno, NV (US)

(72) Inventors: Marc John Brooker, Seattle, WA (US); Marc Levy, Seattle, WA (US); Tarun Goyal, Seattle, WA (US); Mustafa Abrar, Issaquah, WA (US); Madhuvanesh Parthasarathy, Renton, WA (US)

(73) Assignee: Amazon Technologies, Inc., Reno, NV (US)

( * ) Notice: Subject to any disclaimer, the term of this patent is extended or adjusted under 35 U.S.C. 154(b) by 845 days.

(21) Appl. No.: 14/229,319

(22) Filed: Mar. 28, 2014

(51) Int. Cl.
| | |
|---|---|
| *G06F 15/173* | (2006.01) |
| *H04L 12/911* | (2013.01) |
| *H04L 29/08* | (2006.01) |

(52) U.S. Cl.  
CPC .......... *H04L 47/78* (2013.01); *H04L 67/1002* (2013.01)

(58) Field of Classification Search  
CPC ............................. H04L 47/78; H04L 67/1002  
See application file for complete search history.

(56) References Cited

U.S. PATENT DOCUMENTS

| | | | |
|---|---|---|---|
| 5,519,837 A | 5/1996 | Tran | |
| 7,814,192 B2 * | 10/2010 | Kumar | H04L 41/0806 370/238 |
| 8,077,602 B2 | 12/2011 | Arimilli et al. | |
| 8,219,998 B2 | 7/2012 | Taylor et al. | |
| 8,499,096 B2 | 7/2013 | Kwapniewski et al. | |
| 8,565,243 B2 | 10/2013 | Little | |
| 2003/0130833 A1 * | 7/2003 | Brownell | H04L 29/12009 703/23 |
| 2006/0155862 A1 | 7/2006 | Kathi | |
| 2008/0008202 A1 * | 1/2008 | Terrell | H04L 12/5693 370/401 |
| 2010/0251252 A1 * | 9/2010 | Laverone | G06F 9/5061 718/104 |

(Continued)

OTHER PUBLICATIONS

A. Greenberg, J. Hamilton, D. Maltz, P. Patel, The Cost of a Cloud: Research Problems in Data Center Networks, ACM SIGCOMM Computer Communication Review, vol. 39, No. 1, Jan. 2009, pp. 68-73.

*Primary Examiner* — Richard G Keehn  
(74) *Attorney, Agent, or Firm* — Robert C. Kowert; Meyertons, Hood, Kivlin, Kowert & Goetzel, P.C.

(57) ABSTRACT

A distributed system may implement logical control groups for distributed system resources. A request for a particular system resource may be received at a request routing tier for a distributed system that is implemented by multiple computing systems in different respective availability zones. One or more resource control nodes of a resource control tier for the distributed system that are members of a logical control group for the particular system resource may be discovered. A logical control group for the particular system resource may include at least one resource control node in a different availability zone than the availability zone that includes the particular system resource. The request may then be sent to one of the discovered resource control nodes in the logical control group in order to service the request for the particular system resource.

23 Claims, 9 Drawing Sheets

(56) References Cited

U.S. PATENT DOCUMENTS

| | | | |
|---|---|---|---|
| 2012/0059864 A1* | 3/2012 | Bandyopadhyay | H04L 67/1008 707/827 |
| 2013/0275619 A1 | 10/2013 | Yagyu | |
| 2014/0050083 A1* | 2/2014 | Layman | H04L 12/56 370/230 |
| 2014/0201642 A1* | 7/2014 | Vicat-Blanc | H04L 41/22 715/736 |
| 2014/0365626 A1* | 12/2014 | Radhakrishnan | H04L 41/5054 709/222 |
| 2014/0372550 A1* | 12/2014 | Said | H04L 67/1008 709/213 |
| 2015/0106523 A1* | 4/2015 | Cui | H04L 67/1036 709/226 |

* cited by examiner

LOGICAL CONTROL GROUPS FOR DISTRIBUTED SYSTEM RESOURCES

BACKGROUND

Distributed systems have created great opportunities for implementing more efficient and available system architectures. Systems may no longer be limited by the capabilities of an individual computing system, but may instead share the workload for performing complex computing tasks, maintaining and storing data, or implementing various applications or services among multiple different computer systems. For example, in some distributed systems different tiers may perform or provide different functionality for the distributed system. Each tier may be implemented by computing systems optimized to perform the respective functions of the tier, whether optimized by hardware, software, or other specialized configuration. In this way, specific tasks may be performed more efficiently in an optimized environment, and the workload for performing these respective functions may be distributed among different systems configured to share the burden for the respective functions.

Distributed systems may also take advantage of the increased reliability of using diverse physical infrastructure for different computing systems in order to survive failures of different individual systems. Diverse physical infrastructure may provide flexibility for a distributed system to respond to changing conditions or demands inherent in the dynamic environments in which many distributed systems operate. Web-based services, for example, are subject to power or network failures that may affect large numbers of computing systems implementing a distributed system. If the affected computing systems provide a functionality of the web-based service, other computing systems implemented in different physical infrastructures may be used to supply the missing functionality in order to allow the web-based service to continue to operate.

Figure 1:
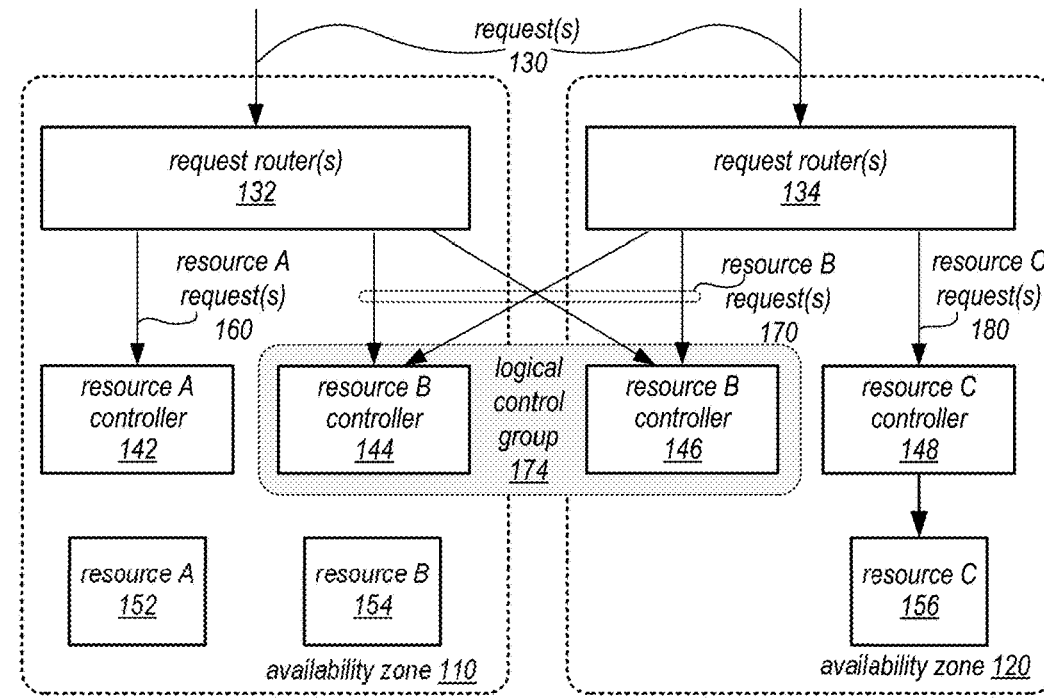
FIG. 1 is a series of block diagrams illustrating logical control groups for distributed system resources, according to some embodiments.
Figure 1:
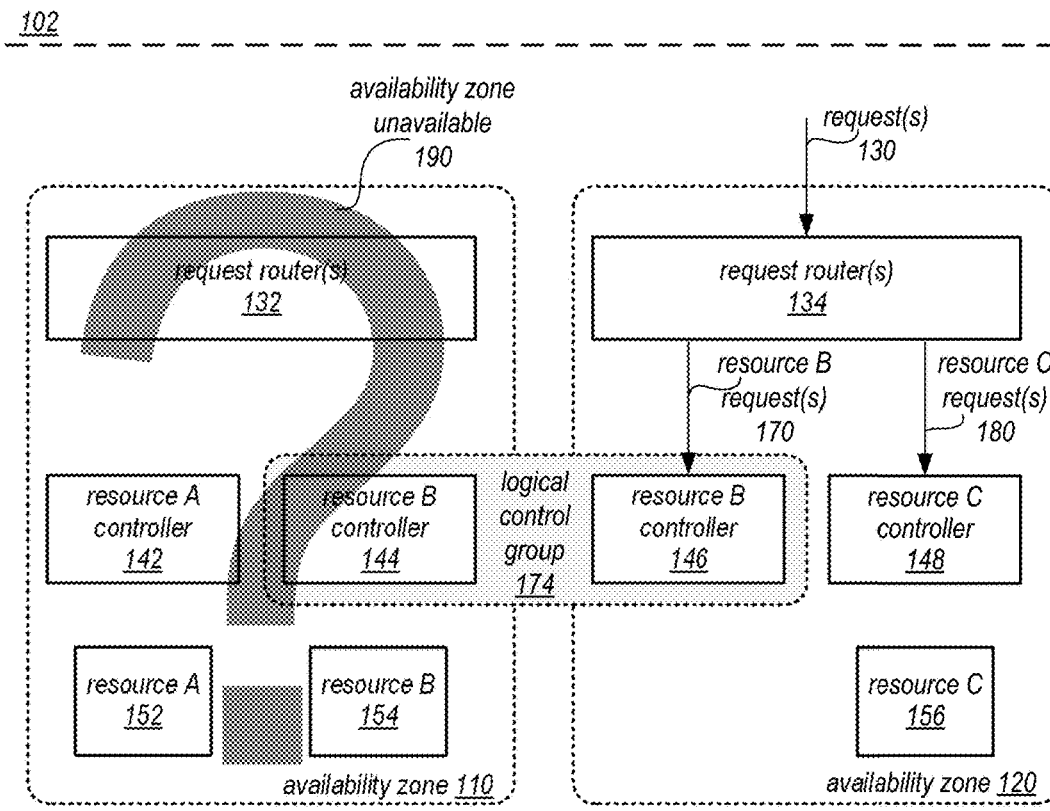

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

The systems and methods described herein may implement logical control groups for distributed system resources. Distributed systems may be used to implement many different functionalities, applications, and/or services without regard to the limitations of an individual computing system. Many computing systems may be used to together in order to efficiently implement these functionalities, applications, and/or services. Specialized components, dedicated systems, or many other optimizations may be used to increase the efficiency of the distributed system. In order to increase the availability of a distributed system, diverse physical infrastructures may be used to implement the computing devices of a distributed system so that failures may be isolated to computing systems which are implemented in affected physical infrastructures. Logical control groups may be implemented to take advantage of the diversity of physical infrastructures and provide diversity for distributed systems dynamically so that system resources may maintain high availability.

Generally, diversity for physical infrastructures is provided according to a static or predetermined scheme for distributed systems. For example, a distributed system may always include control resources in the same availability zone as a resource that is controlled. A static index, or routing technology such as domain name servers (DNS), may be used to route requests to appropriate control resources for servicing. Logical control groups, however, may be implemented in such a way as to adapt or change the location of control resources. For example, new control resources may be added to other availability zones to service requests for a distributed system resource in a different availability zone. These new control resources may be added in response to failures or unreliability of other control resources or to add capacity to handle greater numbers of requests for the system resource.

As the membership of logical control groups for distributed system resources may change, dynamic discovery techniques for identifying control resources may be implemented. For example, a broadcast-and-cache technique for fine-grained resource control discovery, and a distributed gossip protocol for coarse-grained resource control discovery may be implemented, in some embodiments. This may remove the need for statically defined or determined routing techniques for requests to control resources and the need for persistent storage to enable discovery.

FIG. 1 is a series of block diagrams illustrating logical control groups for distributed system resources, according to some embodiments. In scene 102, two different availability zones 110 and 120 may provide distinct infrastructure upon which computing systems or nodes implementing a distributed system may be implemented. Respective request routers 132 and 134 may be implemented to handle requests for particular distributed system resources as part of a request routing tier. Resource controllers 142, 144, 146, and 148 may be configured to service requests for particular distributed system resources as part of a resource control tier. Different resources, resource A 152, resource B 154, and resource C 156 may implemented as part of a resource tier in the two different availability zones. Please note that request routers and/or resource controllers may operate as part of the application layer for a distributed system. For instance, requests received at the distributed system request routers may be received from load balancers or other network traffic controllers, in various embodiments, which may not be implemented as part of the application layer.

In various embodiments, a logical control group may be implemented for a particular distributed system resource. In FIG. 1, a logical control 174 is implemented for resource B 154. A logical resource group may include at least one resource included in a different availability zone than the resource. In embodiments, the logical control groups may be configured to service requests for a specific system resource of the system resources. Resource B controller 146, for instance, is included in availability zone 120, while resource B 154 is included in availability zone 110. As requests 130 are received at request routers 132 and 134 for resource B 154, the request routers 132 and 134 may direct resource B requests 170 to either resource B controller 144 or 146 in logical control group 174. While requests for resource A 160, are directed solely to resource controller 142, which is not a logical control group. Similarly, requests for resource C 180 are directed to resource C controller 148, which is also not in a logical control group. In various embodiments, system resources may be included, mapped, or otherwise "homed" to a particular availability zone, without being replicated across multiple availability zones. For example, sharding techniques may locate particular system resources (e.g., portions of a data object like a data volume or database table) in specific systems isolated to a single availability zone.

As noted above, logical control groups may help to isolate and alleviate failures of particular availability zones, even when a request is directed toward a system resource located in the unavailable availability zone. For instance, scene 104 illustrates that availability zone 110 is unavailable 190. Therefore requests for resource A 152 may no longer be serviced, as there is not resource controller available for resource A 152. A similar fate would befall resource C, if instead availability zone 120 were unavailable. Logical control group 174, however, may provide a resource controller, resource controller B 146, which is still available to service requests for resource B 170. In some embodiments, requests may be serviced when received at resource B controller 146 and acknowledged, or recorded and acknowledged. Recorded requests may be completed at a later time when resource B 154 is available.

In various embodiments, the members of a logical control group for a resource may be discovered at the request routing tier. Instead of statically determining or defining the locations of resource control nodes for system resources (e.g., only co-locating resource control nodes in the same availability zone as the resource controlled), discovery techniques may dynamically locate members of the logical control group for a particular system resource, even though membership may change or be varied differently from resource to resource among availability zones. For example, in some embodiments, a resource control cache may be maintained that describes resource control nodes that are configured to service requests for different system resources. Entries for a resource may be accessed, and if not empty (or invalid) may be used to select a resource control node in a logical control group to send a request to for a particular system resource. The resource control cache may be updated, according to a broadcast query technique based on information maintained at resource control nodes that may perform a gossip-based synchronization protocol. Moreover, as the request routing tier may provide routing as part of the application layer, discovery of resource control nodes in the logical control groups may rely upon greater information and insight to the workings of the distributed system (as would be available in the application layer).

Please note that previous descriptions are not intended to be limiting, but are merely provided as an example of logical control groups for distributed system resources. Differences, for example, such as the number of nodes, resources, availability zones, or members of a resource control group may also be different than illustrated in FIG. 1. For example, in some embodiments, a system resource may be included at two different availability zones, and a logical control group for that particular system resource may be included in a third different availability zone. In another example, a single resource control node may make up a logical control group for resource included in a different availability zone.

This specification begins with a general description of a provider network, which may implement logical control groups for distributed system resources. Then various examples of logical control groups in a network-based service are discussed, including different components/modules, or arrangements of components/modules that may be employed as part of a network-based service. A number of different methods and techniques to implement logical control groups are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
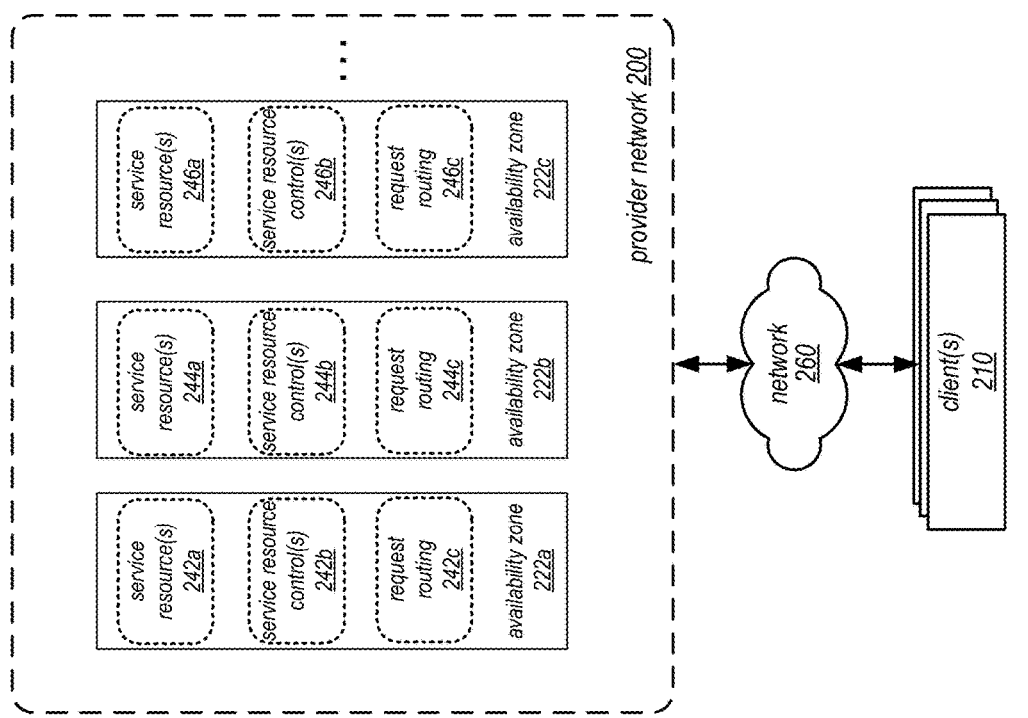
FIG. 2 is a block diagram illustrating a provider network including multiple availability zones for a network-based service that may implement logical control groups for service resources, according to some embodiments.

FIG. 2 is a block diagram illustrating a provider network including multiple availability zones for a network-based service that may implement logical control groups for service resources, according to some embodiments. Provider network 200 may be set up by an entity such as a company or a public sector organization to provide one or more services (such as various types of cloud-based or network-based computing or storage) accessible via the Internet and/or other networks to clients 210. Provider network 200 may include numerous data centers hosting various resource pools, such as collections of physical and/or virtualized computer servers, storage devices, networking equipment and the like (e.g., computing system 1000 described below with regard to FIG. 9), needed to implement and distribute the infrastructure and services offered by the provider network 200. In some embodiments, provider network 200 may implement different tiers to assume different respective functionalities for the provider network, such as request routing, service resource controls, or service resources.

In some embodiments, provider network 200 may organize resources and/or tiers implementing the provider network into or across different availability zones, each of which may include its own physically distinct, independent infrastructure on which a collection of computing systems or nodes (e.g., computing nodes on which resource control nodes that implement the resource control tier are implemented, computing nodes on which the request routing tier are implemented and/or computing nodes on which service resources are implemented). In some embodiments, each availability zone may reside in a different location or region, while in other embodiments multiple availability zones may reside in the same location or region. Availability zones may be isolated from failures in other availability zones. Thus, a failure in one availability zone may not affect the operation of computing systems in another availability zone. Availability zones may be considered a fault tolerant zone. The respective failure scope of availability zones may be such that respective portions of the request routing tier, the resource control tier, and the resource tier included in an availability zone may operate irrespective of failures in another availability zone, in some embodiments.

Different availability zones may implement respective portions of the different tiers of the provider network. For example, as illustrated in FIG. 2, availability zone 222a includes service resource(s) 242a, service resource control(s) 242b, and request routing 242c. Similarly, availability zones 222b and 222c may implement respective service resources 244a and 246a, respective service resource control(s) 244b and 246b, and respective request routing 244b and 246c.

In various embodiments, the request routing tier may include various different systems or devices to receive, parse, respond to, or direct requests that are received from clients 210 (or systems or components internal to provider network 200 such as another network-based service). In some embodiments, load balancers and/or other network routing controls may receive the client requests and direct them on to the request routing tier. In some embodiments, the request routing tier may be configured to implement or perform various discovery mechanisms to select a service resource control configured to handle the request, as discussed below with regard to FIGS. 3 and 4.

In some embodiments, the service resource control tier may include multiple resource control nodes to implement the service resource control tier. These resource control nodes may be included in respective pools of resource control nodes in each availability zone, such as service resource control(s) 242b in availability zone 222a. Resource control nodes may, in some embodiments, provide management functionality or coordination for service resources in the resource tier. For example, resource control nodes may initialize, set-up, configure, start, stop, modify, delete or otherwise control a service resource that is implemented as part of a network-based service. In some embodiments, resource control nodes may be configured to perform requests which the system resources themselves cannot perform. Resource control nodes in the resource control tier may interact with multiple different systems, components, or devices as part of servicing requests, in some embodiments.

Provider network 200 may implement one or more different network-based services. In some embodiments, provider network 200 may provide computing resources, such as virtual compute services, storage services, such as block-based storage services and other storage services (which may include various storage types such as object/key-value based data stores or various types of database systems), and/or any other types of network-based services. Clients 210 may access these various services offered by provider network 200 via network 260. Likewise network-based services may themselves communicate and/or make use of one another to provide different services. For example, computing resources offered to clients 210 in units called "instances," such as virtual or physical compute instances or storage instances, may make use of particular data volumes, providing virtual block storage for the compute instances. Service resources in the service resource tier may be the client accessible or operable portions of the network-based service associated with a particular client 210 (or customer account linked to a client 210).

As noted above, a virtual compute service may offer various compute instances to clients 210. A virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). A number of different types of computing devices may be used singly or in combination to implement the compute instances of a virtual compute service in different embodiments, including general purpose or special purpose computer servers, storage devices, network devices and the like. In some embodiments instance clients 210 or other any other user may be configured (and/or authorized) to direct network traffic to a compute instance. In various embodiments, compute instances may attach or map to one or more data volumes provided by a block storage service in order to obtain persistent block-based storage for performing various operations. Compute instances and/or data volumes may be various service resources in the resource tier, in some embodiments.

Compute instances may operate or implement a variety of different platforms, such as application server instances, Java™ virtual machines (JVMs), general purpose or special-purpose operating systems, platforms that support various interpreted or compiled programming languages such as Ruby, Perl, Python, C, C++ and the like, or high-performance computing platforms) suitable for performing client applications, without for example requiring the client 210 to access an instance. In some embodiments, compute instances have different types or configurations based on expected uptime ratios. The uptime ratio of a particular compute instance may be defined as the ratio of the amount of time the instance is activated, to the total amount of time for which the instance is reserved. Uptime ratios may also be referred to as utilizations in some implementations. If a client expects to use a compute instance for a relatively small fraction of the time for which the instance is reserved (e.g., 30%-35% of a year-long reservation), the client may decide to reserve the instance as a Low Uptime Ratio instance, and pay a discounted hourly usage fee in accordance with the associated pricing policy. If the client expects to have a steady-state workload that requires an instance to be up most of the time, the client may reserve a High Uptime Ratio instance and potentially pay an even lower hourly usage fee, although in some embodiments the hourly fee may be charged for the entire duration of the reservation, regardless of the actual number of hours of use, in accordance with pricing policy. An option for Medium Uptime Ratio instances, with a corresponding pricing policy, may be supported in some embodiments as well, where the upfront costs and the per-hour costs fall between the corresponding High Uptime Ratio and Low Uptime Ratio costs.

Compute instance configurations may also include compute instances with a general or specific purpose, such as computational workloads for compute intensive applications (e.g., high-traffic web applications, ad serving, batch processing, video encoding, distributed analytics, high-energy physics, genome analysis, and computational fluid dynamics), graphics intensive workloads (e.g., game streaming, 3D application streaming, server-side graphics workloads, rendering, financial modeling, and engineering design), memory intensive workloads (e.g., high performance databases, distributed memory caches, in-memory analytics, genome assembly and analysis), and storage optimized workloads (e.g., data warehousing and cluster file systems). Size of compute instances, such as a particular number of virtual CPU cores, memory, cache, storage, as well as any other performance characteristic may be configured. Configurations of compute instances may also include their location, in a particular data center, availability zone, geographic, location, etc. . . . and (in the case of reserved compute instances) reservation term length.

A block-based storage service may be implemented as network-based service for performing storage operations. The block-based storage service may be a storage system, composed of a pool of multiple independent storage nodes (e.g., server block data storage systems), which provide block level storage for storing one or more sets of data volumes. Data volumes may be mapped to particular clients, providing virtual block-based storage (e.g., hard disk storage or other persistent storage) as a contiguous set of logical blocks.

Resource control nodes in the resource control tier may, in some embodiments, assist in the operation of the block-based storage service. In various embodiments, for example, the resource control tier may manage the availability of block data storage to clients, such as programs executing on compute instances provided by a virtual compute service and/or other network-based services located within provider network 200 and/or optionally computing systems (not shown) located within one or more other data centers, or other computing systems external to provider network 200 available over a network 260. Access to data volumes may be provided over an internal network within provider network 200 or externally via network 260, in response to block data transaction instructions.

The resource control tier may provide a variety of services related to providing block level storage functionality, including the management of user accounts (e.g., creation, deletion, billing, collection of payment, etc.). The resource control tier may further provide services related to the creation, usage and deletion of data volumes in response to configuration requests.

Clients 210 may encompass any type of client configurable to submit requests to provider network 200. For example, a given client 210 may include a suitable version of a web browser, or may include a plug-in module or other type of code module configured to execute as an extension to or within an execution environment provided by a web browser. Alternatively, a client 210 may encompass an application such as a database application (or user interface thereof), a media application, an office application or any other application that may make use of compute instances, a data volume, or other network-based service in provider network 200 to perform various operations. In some embodiments, such an application may include sufficient protocol support (e.g., for a suitable version of Hypertext Transfer Protocol (HTTP)) for generating and processing network-based service requests without necessarily implementing full browser support for all types of network-based data. In some embodiments, clients 210 may be configured to generate network-based service requests according to a Representational State Transfer (REST)-style network-based service architecture, a document- or message-based network-based service architecture, or another suitable network-based service architecture. In some embodiments, a client 210 (e.g., a computational client) may be configured to provide access to a compute instance or data volume in a manner that is transparent to applications implemented on the client 210 utilizing computational resources provided by the compute instance or block storage provided by the data volume.

Clients 210 may convey network-based service requests to provider network 200 via external network 260. In various embodiments, external network 260 may encompass any suitable combination of networking hardware and protocols necessary to establish network-based communications between clients 210 and provider network 200. For example, a network 260 may generally encompass the various telecommunications, networks and service providers that collectively implement the Internet. A network 260 may also include private networks such as local area networks (LANs) or wide area networks (WANs) as well as public or private wireless networks. For example, both a given client 210 and provider network 200 may be respectively provisioned within enterprises having their own internal networks. In such an embodiment, a network 260 may include the hardware (e.g., modems, routers, switches, load balancers, proxy servers, etc.) and software (e.g., protocol stacks, accounting software, firewall/security software, etc.) necessary to establish a networking link between given client 210 and the Internet as well as between the Internet and provider network 200. It is noted that in some embodiments, clients 210 may communicate with provider network 200 using a private network rather than the public Internet.

Figure 3:
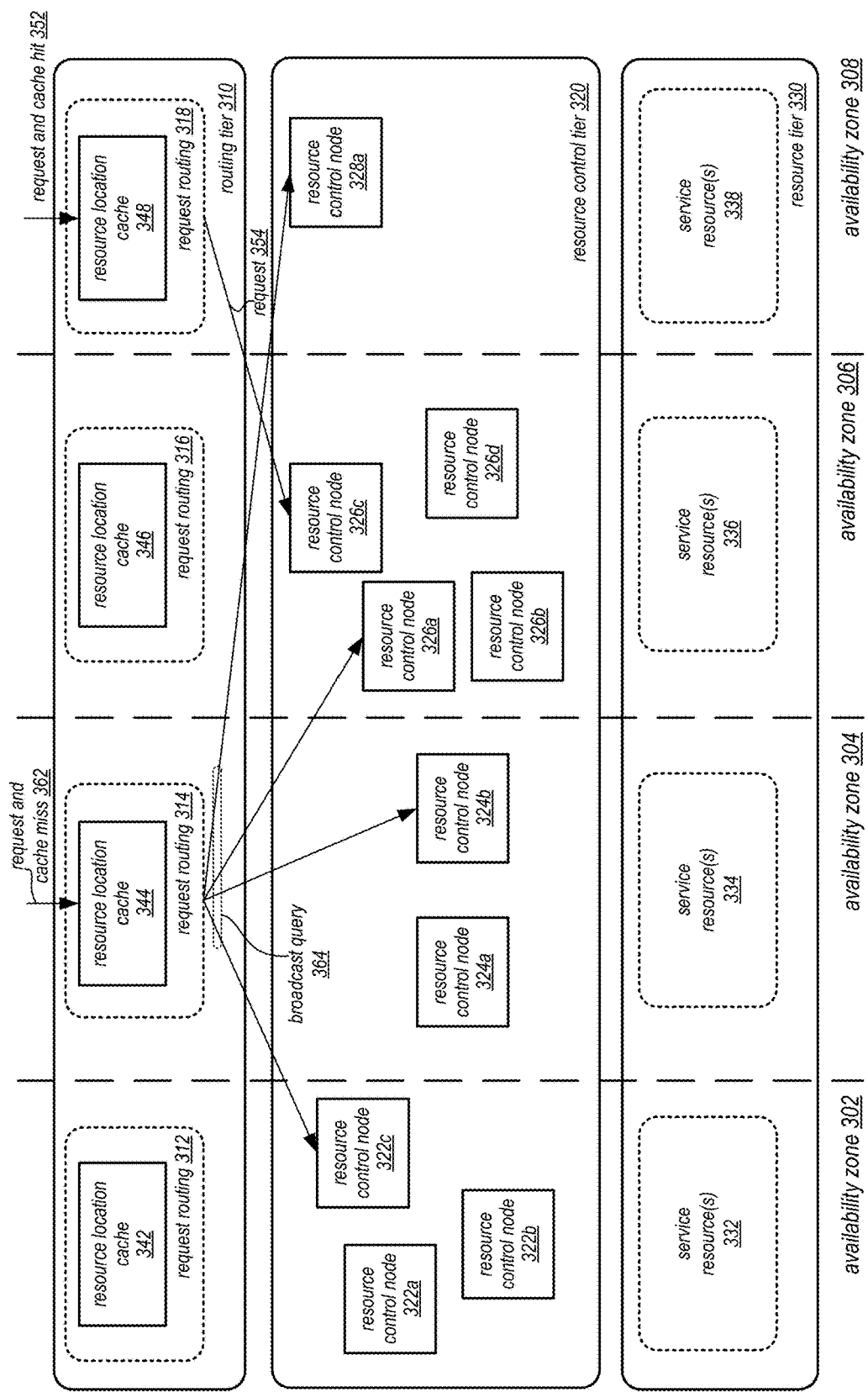
FIG. 3 is a block diagram illustrating broadcast and cache discovery techniques for discovering resource control nodes in logical control groups in different availability zones, according to some embodiments.

The provider network discussed above with regard to FIG. 2 may implement logical control groups for system resources. Members of the logical control groups for system resources may be discovered according to many different techniques which may account for the dynamic changes in membership or availability of resource control nodes in a logical control group. FIG. 3 is a block diagram illustrating broadcast and cache discovery techniques for discovering resource control nodes in logical control groups in different availability zones, according to some embodiments.

A network-based service may implement different tiers to provide different functionalities of the network-based service. In FIG. 3, a routing tier 310 is implemented to direct requests to different resource control nodes implemented in resource control tier 320. Resource control tier 320 is implemented in order to handle service requests for service resources located in resource tier 330. Resource tier 330 is implemented to maintain system resources for the network-based service. Different portions of these tiers may be implemented on different computing systems included in different availability zones. For instance, FIG. 3 illustrates 4 availability zones, 302, 304, 306, and 308 as including portions of routing tier 310, resource control tier 320, and resource tier 330.

Request routing tier 310 may include, in various embodiments, request routing components 312, 314, 316, and 318, which may be one or more computing systems or devices in each of the respective availability zones 302, 304, 306, and 308. Request routing tier 310 may also maintain a resource control cache which may indicate or describe locations of resource control nodes configured to service requests for different system resources, in some embodiments. Different respective entries in the resource control cache may be maintained for individual system resources in the resource tier. An entry may include identification and or location information (e.g., ID or network address) for one or more resource control nodes in the logical control group for the individual system resource. Other information may also be maintained in the entry, in some embodiments, that provides further description of the identified resource control nodes (e.g., performance characteristics, such as average response time, workload of the resource control node, such as a number of requests currently being processed, or how many other system resources the resource control node is configured to handle requests for). The resource control cache may be distributed (as illustrated in FIG. 3) among the different respective request routing components, such as resource control cache 342, 344, 346, and 348. Each of these different resource control caches may mirror the other respective resource control caches in other availability zones, operate as an independent cache for that availability zone, or may be different respective portions of the cache. In some embodiments, the resource control cache may be a single or monolithic system in request routing tier 310 dedicated to maintaining the resource control cache.

Resource control tier 320 may implement multiple different resource control nodes, such as resource control nodes 322a, 322b, 322c, 324a, 324b, 326a, 326b, 326c, and 328a. These resource control nodes may be configured to service requests for particular service resources in resource tier 330. Resource tier 330 may include different service resources in different availability zones, such as service resources 332, 334, 336, and 338, which may be various resources, as discussed above with regard to FIG. 2, that are associated with different clients of a network-based service.

When a request for a particular service resource is received at the request routing tier 310, the resource location cache may be accessed, in some embodiments, as part of discovering a resource control node in the logical control group for the service resource. An entry for the particular service resource may be evaluated. If the cache entry indicates one or more resource control nodes, then at least one of the resource control nodes may be selected and sent the request. For instance, FIG. 3 illustrates a request 352 received at request routing component 318 for a particular service resource. Resource control cache 348 may include an entry for the particular service resource that is not empty, invalid or incorrect (resulting in a cache "hit"). Request routing component 318 may then direct the request 354 to the indicated service control node 326c, which may service the request.

Figure 5:
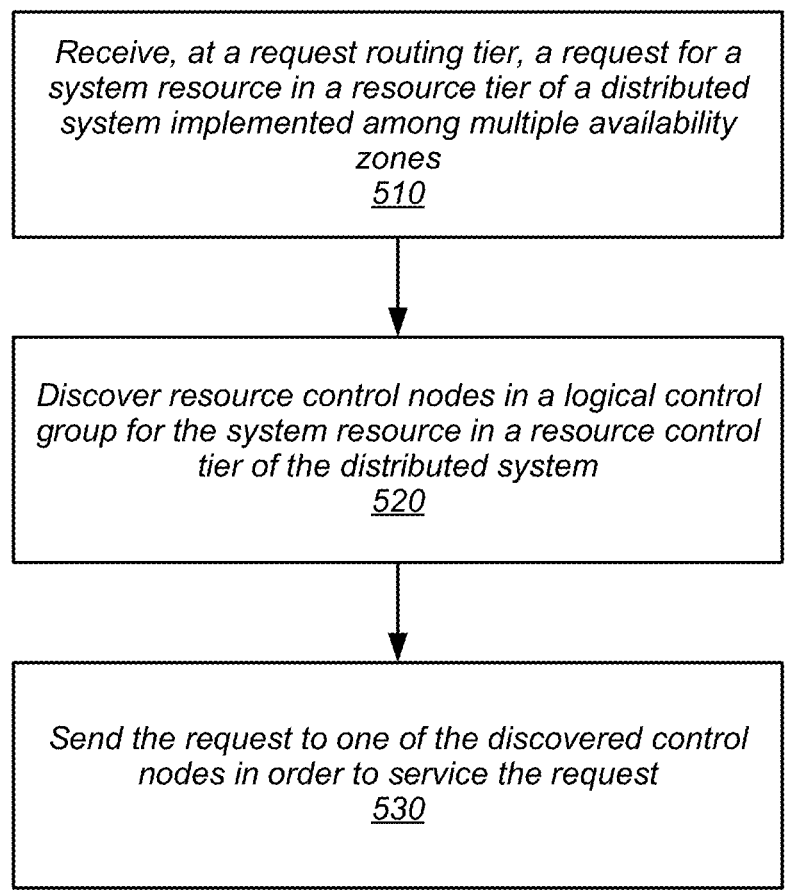
FIG. 5 is a high-level flowchart illustrating various methods and techniques for servicing requests for system resources in a distributed system implementing logical control groups, according to some embodiments.
Figure 6:
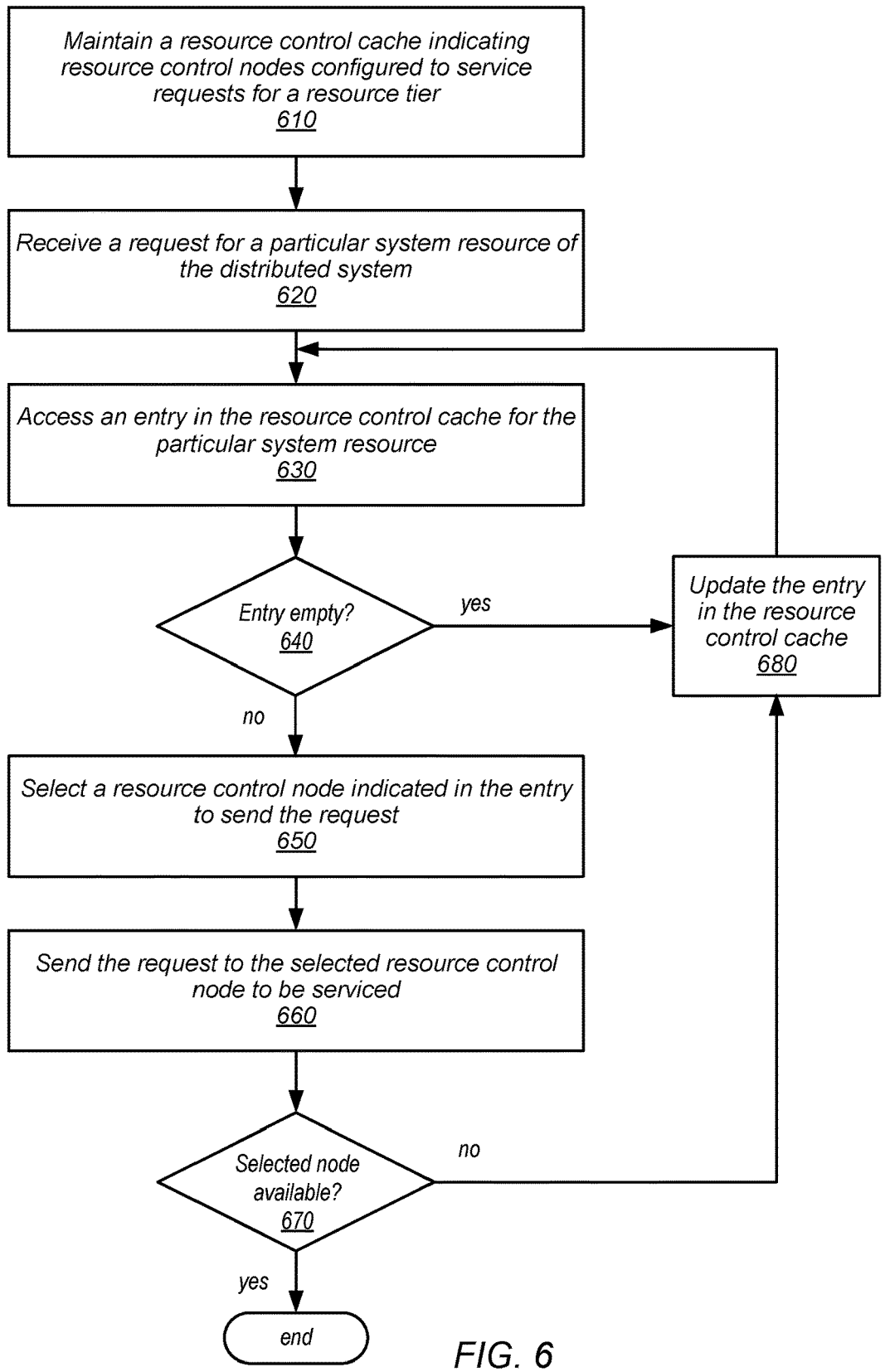
FIG. 6 is a high-level flowchart illustrating various methods and techniques for discovering resource control nodes in a logical control group, according to some embodiments.
Figure 7:
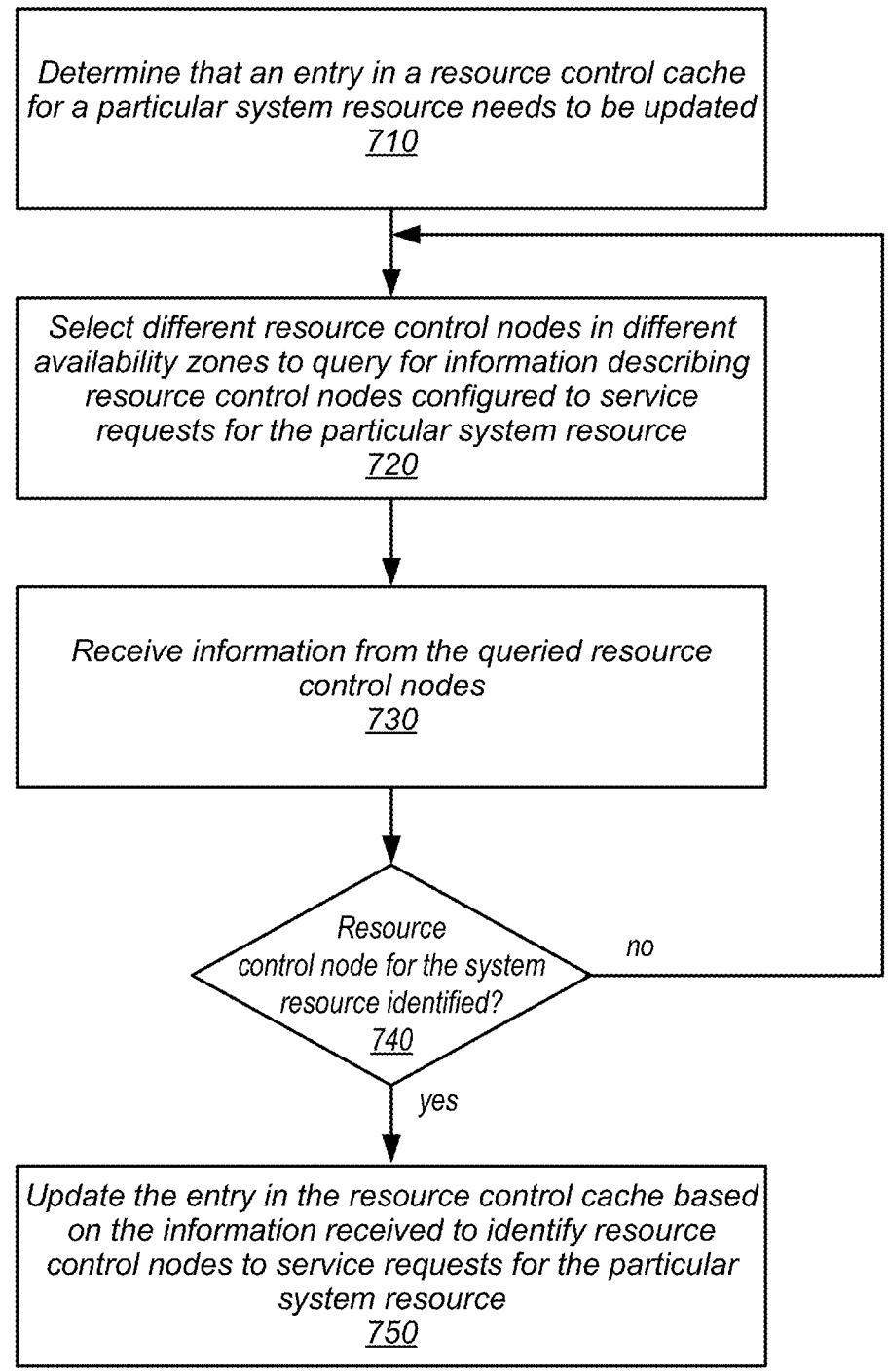
FIG. 7 is a high-level flowchart illustrating various methods and techniques for updating a resource control cache describing resource control nodes that service requests for distributed system resources, according to some embodiments.

In another example, a request may be received at request routing tier 310, and the resource control cache 344 for the request routing component 314 directing the request may be empty, or otherwise invalid or incorrect (resulting in a cache "miss"). A broadcast query 364 for information describing resource control nodes configured to service requests for the particular service resource may be sent to multiple different resource control nodes, in some embodiments. For instance, resource control nodes in different availability zones may be selected and sent the query 364, as illustrated in FIG. 3 (the query being sent to resource control node 322c in availability zone 302, resource control node 324b in availability zone 304, resource control node 326a in availability zone 306, and resource control node 328a in availability zone 308). Resource control nodes may perform a gossip-based synchronization protocol with other resource control nodes, as described in greater detail with regard to FIG. 4 below. None, some or all of the varied resource control nodes sent broadcast query 364 may respond with the descriptive information requested. If the requested information identifies a resource control node that is configured to service requests for the particular service resource, then the entry in resource control cache 344 may be updated (and possibly updated in other versions or portions of the resource cache 342, 346, and 348 in some embodiments) based on the received information. FIGS. 5-7, discussed below, provide greater detail of various techniques for discovering resource control nodes in logical control groups and accessing and/or updating a resource control cache which may be implemented by the network-based service illustrated in FIGS. 3 and 4. For instance, multiple broadcast queries may be sent before an entry in the resource control cache may be updated. Alternatively, multiple resource control nodes in an availability zone or not all availability zones may be sent a broadcast query, in some embodiments. Thus, the previous examples are not intended to be limiting.

Figure 4:
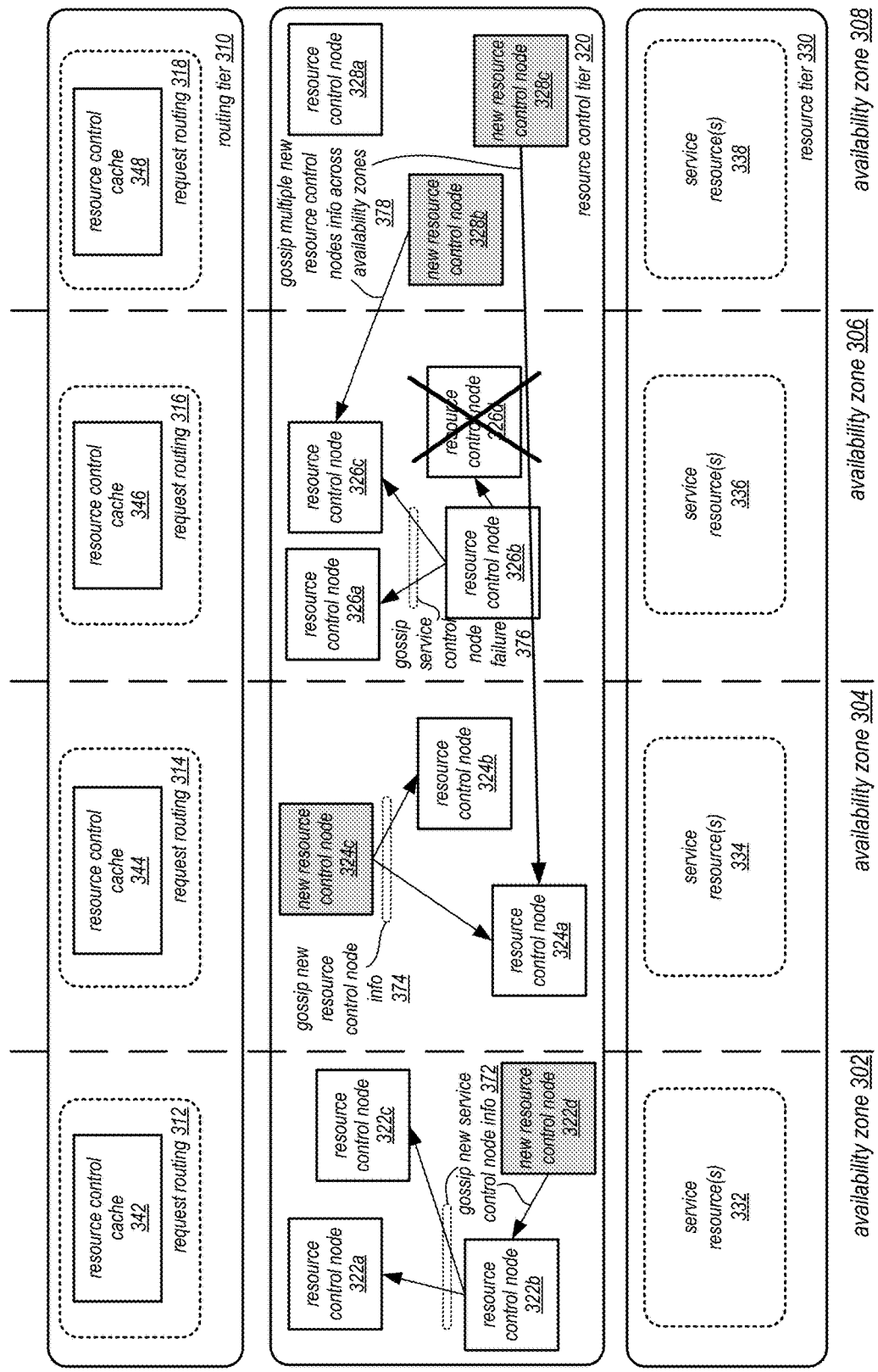
FIG. 4 is a block diagram illustrating gossip-based synchronization techniques for discovering resource control nodes in logical control groups in different availability zones, according to some embodiments.

FIG. 4 is a block diagram illustrating gossip-based synchronization techniques for discovering resource control nodes in logical control groups in different availability zones, according to some embodiments. As noted above with regard to FIG. 3, resource control tier 320 may implement various resource control nodes 322a, 322b, 322c, 322d, 324a, 324b, 324c, 326a, 326b, 326c, 326d, 328a, 328b, and 328c. These resource control nodes maybe configured to service requests for one or more particular ones of service resources 332, 334, 336, and 338 implemented in resource tier 330.

Each resource control node may, in some embodiments, maintain descriptive information (e.g., metadata) about other resource control nodes. This descriptive information may include the identity and/or location of resource control nodes configured to service requests for different respective system resources (e.g., an ID or network address). Other information may also be included, in at least some embodiments, that further describes the resource control nodes (e.g., performance characteristics, such as average response time, workload of the resource control node, such as a number of requests currently being processed, or how many other system resources the resource control node is configured to handle requests for). In some embodiments, the information may indicate whether resource control nodes are co-located in the same availability zone as system resources which they are configured to service requests for. In various embodiments, resource control nodes implemented in resource control tier 320 may implement a gossip-based synchronization protocol to communicate this descriptive information about other respective resource control nodes (as well the respective node itself) to other resource control nodes.

Consider one example illustrated in FIG. 4. A new service control node 322d has become available in availability zone 302. This new service control node 322d may communicate 372 new descriptive information about itself (e.g., system resources that it is configured to handle requests for) to another resource control node 322b in availability zone 302. Resource control node 322b may, in turn, gossip the descriptive information 372 about new resource control node 322d to resource control nodes 322a and 322c. Although not illustrated, resource control nodes 322b, 322c, and 322a, may also gossip back descriptive information which they maintain to new resource control node 322d as well. In this way, a query directed toward resource node 322a, 322b, 322c, or 322d for information regarding a system resource that new resource control node 322*d* is configured to service requests for may be answered indicating that new resource control node 322*d* is available to service that particular request.

In another example illustrated in FIG. 4, new resource control node 324*c* may gossip new resource control node information 374 to multiple resource control nodes, 324*a* and 324*b* upon becoming available to service requests. In various embodiments, new resource control nodes 328*b* and 328*c* may gossip new resource control node information 378 to across availability zones to resource control node 324*a* and 326*c*.

Gossip-based synchronization protocols may communicate other changes to resource control nodes, in addition to new resource control nodes. Resource control node 326*d*, for instance may become unavailable (e.g., due to a system failure). Resource control node 326*b* may detect that 326*d* is no longer available, and gossip resource control node information about the failure 376 to other resource control nodes 326*a* and 326*b*. In some embodiments, other information or changes to resource control nodes may be included in or instigate the performance of the gossip-based synchronization protocol (e.g., changes in performance characteristics of the resource control nodes or workload of the resource control nodes).

Although the illustrations and accompanying descriptions with regard to FIG. 3 discuss gossip-based synchronization among resource control nodes in a particular availability zone, the previous description is not intended to be limiting. In some embodiments, gossip-based synchronization may occur between resource control nodes located in different availability zones as well. In some embodiments, gossip-based synchronization information may be communicated to computing systems in other tiers of a distributed system as well, such as to computing systems implementing request routing tier 310 (e.g., request routing components 312, 314, 316, and 318).

The examples of implementing logical control groups for distributed system resources discussed above with regard to FIGS. 2-4 have been given in regard to a provider network, which may implement one or more network-based services. Various other types or configurations of distributed systems may implement these techniques. FIG. 5 is a high-level flowchart illustrating various methods and techniques for servicing requests for system resources in a distributed system implementing logical control groups, according to some embodiments. These techniques may be implemented using computing systems or nodes as described above with regard to FIGS. 2-4, or other types or arrangements of computing systems or devices, such as those described below with regard to computing system 1000 in FIG. 9.

Multiple computing systems may together implement a distributed system. These computing systems may be distributed among different respective availability zones that include these computing systems. An availability zone, as noted above, may include its own physically distinct, independent infrastructure on which a collection of computing systems (or nodes) may be implemented, in some embodiments. Thus, the distribution of computing systems implementing the distributed system among different respective availability zones may isolate the computing systems in one availability zone from a failure (e.g., power or network) affecting computing systems in another availability zone. System resources may be mapped to or located in particular availability zones, without being replicated in another availability zone, in some embodiments.

In various embodiments, a distributed system may implement different tiers to provide different functionality for the distributed system. As discussed above with regard to FIGS. 1-4, in some embodiments, the distributed system may implement a request routing tier, a resource control tier, and resource tier. The request routing tier may direct requests for system resources implemented in the resource tier to appropriate resource control nodes implemented in the resource control tier that are authorized or configured to service requests for a particular system resource. The request routing tier may provide request routing as part of the application layer in the distributed system. In various embodiments, one or more resource control nodes may be included in a logical control group for a particular system resource. A logical control group may include at least one resource control node included in a different availability zone than the availability zone that includes the system resource which the logical control group handles requests for (e.g., resource B controller 146 discussed above with regard to FIG. 1).

As indicated at 510, a request may be received at a routing tier for a system resource in a resource tier of a distributed system that is implemented among multiple availability zones, in various embodiments. The request may be formatted according to an application programming interface (API) or other communication protocol for the distributed system, and may include an identifier for the system resource toward which the request is directed. The request may be received, in some embodiments, from a load balancer or another network traffic controller that is not located in the application layer of the distributed system.

As indicated at 520, in various embodiments, resource control nodes in a logical control group for the system resource may be discovered. Discovery techniques may account for the dynamic changes to membership in the resource control group. For instance, different availability zones including members of the resource control group may become unavailable, rendering their included resource control nodes unavailable for servicing requests. The techniques for discovery resource control nodes in a logical control group that are currently available to service a request for the system resource may account for these unavailable resource control nodes by discovering other resource control nodes that may service the request. Discovery techniques may be implemented as part of the business logic of a distributed system. FIGS. 6 and 7 described in greater detail below provide many examples of different methods and techniques which may be implemented to discover resource control nodes in a logical control group for a system resource. For instance, various fine-grained discovery techniques, such as a broadcast query techniques may be combined with coarse-grained discovery techniques, such as gossip-based synchronization techniques, to efficiently discover resource control nodes in a logical control group from a large group of resource control nodes spread across many availability zones, without relying upon a static or predefined scheme for assigning locations to resource control nodes, in various embodiments.

As indicated at 530, the request may then be sent to one of the discovered control nodes in order to service the request, in some embodiments. As discussed below with regard to FIG. 8, the request may be sent to a resource control node that is not located in a same availability zone as the availability zone that includes the system resource. In some embodiments, the request may be serviced, or recorded for future performance, and acknowledged as completed or recorded.

Particular resource control nodes in the resource control tier that may service requests for a system resource may change over time. Failures, additions, reconfigurations, or any other event that changes membership of resource control nodes in a logical control group for the system resource may render previously maintained information about a logical control group obsolete. Instead of relying upon statically defined schemes for a resource control (e.g., by only including a resource control node in a same availability zone as the resource it is configured to service requests for), dynamic techniques to discover resource control nodes currently in a logical control group for a system resource may be implemented. FIG. 6 is a high-level flowchart illustrating various methods and techniques for discovering resource control nodes in a logical control group, according to some embodiments.

As indicated at 610, in various embodiments, a resource control cache may be maintained that indicates resource control nodes configured to service requests for system resources in the resource tier. Different respective entries in the cache may be maintained for individual system resources in the resource tier. An entry may include identification and or location information (e.g., ID or network address) for one or more resource control nodes in the logical control group for the individual system resource. Other information may also be maintained in the entry, in some embodiments, that provides further description of the identified resource control nodes (e.g., performance characteristics, such as average response time, workload of the resource control node, such as a number of requests currently being processed, or how many other system resources the resource control node is configured to handle requests for).

As indicated at 620, a request may be received for a particular system resource. The entry corresponding to the particular system resource may be accessed, as indicated at 630. If the accessed entry is empty (or otherwise indicated to be invalid or incorrect), as indicated by the positive exit from 640, then the entry in the resource control cache may be updated, as indicated at 680. The cache entry may be updated according to various different techniques. For instance, FIG. 7, discussed in detail below describes a broadcast technique that queries different resource control nodes in the resource control tier for information describing resource control nodes configured to service requests for the particular system resource. Resource control nodes in the resource control tier may maintain the requested information by performing a gossip-based synchronization protocol to communicate descriptive information about other resource control nodes to one another.

If, as indicated by the negative exit from 640, the entry is not empty, then a resource control node indicated in the entry may be selected to send the request to, in various embodiments. In some instances, the entry may include only a single resource control node, while in other instances multiple resource control nodes may be indicated. In various embodiments a selection of one (or more than one) resource control nodes may be made from among the indicated resource control nodes. This selection may be based, at least in part, on other descriptive information maintained about the resource control nodes in the entry for the system resource. For example, in some embodiments, an intelligent selection scheme may be implemented to select the resource control node with the greatest capacity or capability to handle the request (e.g., based on workload information and/or performance characteristics about the different resource control nodes). In another example, the selection scheme may be configured to prioritize resource control nodes that are co-located in the same availability zone that includes the particular system resource.

Once selected, the request may be sent to the selected resource control node to be serviced, as indicated at 660. In some embodiments, it may be determined whether the selected resource control node received and/or serviced the request. The selected resource control node may be determined to be unavailable, as indicated at 670. For example, control functionality for the particular system resource may have been moved to a different resource control node in the same or different availability zone. For unavailable resource control nodes that are unable to service the request, as indicated by the negative exit from 670, the entry for the resource control cache may be updated, as indicated at 680, and elements 630 through 670 may be repeated until the selected node is available, as indicated by the positive exit from 670, and the request serviced. In some embodiments, such as those instances where multiple resource control nodes may be indicated in a cache entry, another intelligent selection may be made from the remaining untried resource control nodes in the cache entry so that the other possible resource control nodes may be tried for servicing the request without performing a complete update of the cache entry.

A resource control cache or other information describing resource control nodes configured to service requests for particular system resources may be implemented in volatile or non-persistent storage, in various embodiments. Additionally, storage for the resource control cache may be limited, in some embodiments. System memory devices (e.g., RAM or similar memory technologies), for example, may be used to implement a resource control cache for quick access, but may be cost prohibitive to store information for a large number of resource control nodes at the same time. Therefore, different techniques of updating the resource control cache may be implemented so that the resource control cache may be updated dynamically, without necessitating that the resource control cache persistently maintain information for every resource control node in a resource control tier for the distributed system. FIG. 7 is a high-level flowchart illustrating various methods and techniques for updating a resource control cache describing resource control nodes that service requests for distributed system resources, according to some embodiments.

As indicated at 710, a determination may be made that an entry in a resource control cache for a particular system resource needs to updated, in some embodiments. For instance, as illustrated in FIG. 6, an empty entry or an error response or other indication that the entry is incorrect may indicate that the entry needs to be updated. In some embodiments, a determination that a particular availability zone is no longer available may be used to identify as incorrect entries that contain resource control nodes included in the availability zone that is not available.

In response to determining that an entry in the resource control cache is to be updated, different resource control nodes in different availability zones may be selected to query for information describing resource control nodes configured to service requests for the particular system resource, as indicated at 720, and queries sent to the selected resource control nodes for the information. These queries may be formatted according to various application programming interface (API) specifications or other protocols. In some embodiments, different resource control nodes may be selected from different availability zones. For instance, if there are 4 availability zones, a different resource control node may be selected in each of the 4 availability zones. Although, in some embodiments, less than all of the availability zones may have a resource control node selected (e.g., 3 out of 4 availability zones if a particular availability zone out of the 4 is unavailable), or multiple ones from the different availability zones may also be selected (which may increase the likelihood of receiving the desired information).

A gossip-based synchronization protocol may be performed, in some embodiments, among the various resource control nodes implementing the resource control tier in the distributed system. When, therefore, one of the resource control nodes is queried for information regarding resource control nodes configured to service requests for a particular control plane instance, the queried resource control node may evaluate descriptive information maintained at the resource control node about other resource control nodes to determine whether one or more resource control nodes that can service requests for the system resource can be identified. For instance, as discussed above with regard to FIG. 4, new resource control nodes configured to service requests for a particular system resource or resource control nodes that are no longer available to service the particular system resource may be detected using the gossip-based synchronization protocol. One resource control node may contact one or more other resource control nodes in the same availability zone and communicate information descriptive of other resource control nodes that the communicating node maintains to the other contacted resource control nodes (e.g., if a new resource control node is discovered or an unavailable resource control node is discovered). Those contacted resource control nodes may update their own respectively maintained information describing other resource control nodes, and contact other resource control nodes to continue passing along newly obtained information. Eventually, if no new information is introduced, the resource control nodes in the group of resource control nodes that perform the gossip-based synchronization protocol (e.g., resource control nodes within a particular availability zone, portion of an availability zone, or across multiple availability zones or tiers) may achieve a state of synchronization such that each resource control node maintains the same descriptive information.

The gossip-based synchronization protocol may be repeated among the resource control nodes in the resource control tier in such a way that information describing resource control nodes may be maintained at many different resource control nodes. In some embodiments, the gossip-based synchronization protocol may be performed such that information is only communicated or "gossiped" to other resource control nodes in the same availability zone. Consequently, a selection of different nodes queried from some or all of the availability zones including computing systems implementing the distributed system may be expected to maintain descriptive information concerning many different resource control nodes in the respective availability zone. Thus, when querying different resource control nodes for descriptive information regarding resource control nodes that are configured to service requests for a particular system resource, the likelihood is increased that many of the queried resource control nodes may maintain some of the requested information. This may lead to less iterations of query and response between a request routing tier attempting to identify resource control nodes for a system resource and the resource control nodes.

As indicated at 730, information may be received from the queried resource control nodes, in some embodiments. In some embodiments, queried resource control nodes may respond whether the requested information is maintained at the resource control node or not, so the request routing tier may be able to determine whether any queries remain to be answered. In other embodiments, only those resource control nodes that maintain the requested information for the particular system resource may respond.

Information received from the resource control nodes may include the identity and/or location of resource control nodes configured to service requests for the particular system resource (e.g., an ID or network address), in various embodiments. Other information may also be included, in at least some embodiments, that further describes the resource control node (e.g., performance characteristics, such as average response time, workload of the resource control node, such as a number of requests currently being processed, or how many other system resources the resource control node is configured to handle requests for). In some embodiments, the information may indicate whether the resource control node is co-located in the same availability zone as the particular system resource.

Based, at least in part, on the information received from the queried resource control nodes, it may be determined whether a resource control node configured to service requests for the particular system resource may be identified, as indicated at 740. If so, as indicated by the positive exit from 740, then the entry in the resource control cache based on the information received to identify resource control nodes configured to service requests for the particular system resource, as indicated at 750, which may be used to direct requests to one or more resource control nodes indicated in the updated entry in the resource control cache.

If a resource control node in the logical control group for the system resource is not identified, then the technique may be repeated as indicated by the negative exit from 740 to perform elements 720 and 730 again until a resource node to service the request is identified.

Figure 8:
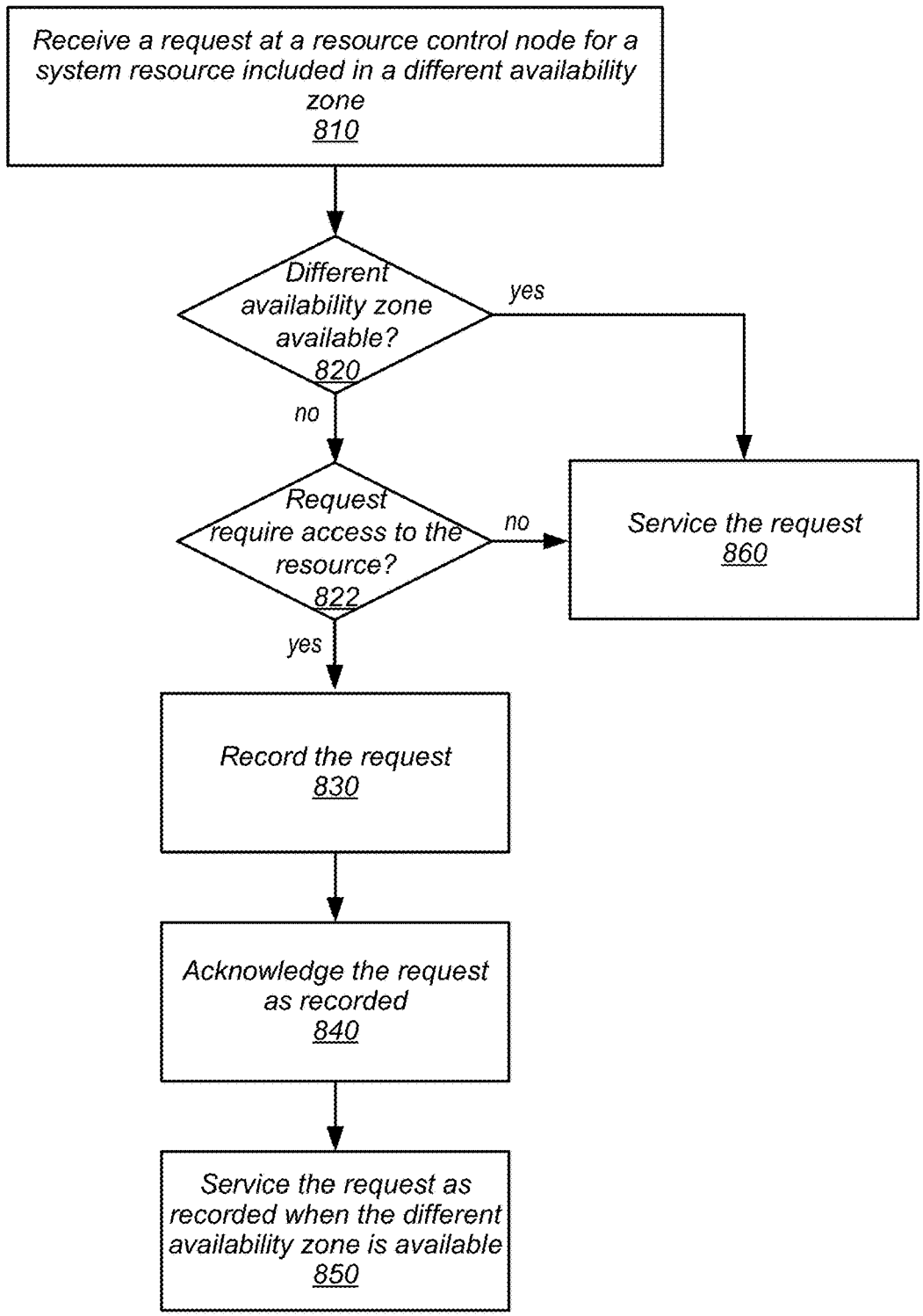
FIG. 8 is a high-level flowchart illustrating various methods and techniques for servicing requests at resource control nodes in a logical control group included in a different availability zone than an availability zone implementing a requested system resource, according to some embodiments.

Logical control groups may allow a distributed system to remain available to service requests for a system resource, even when the availability zone including the distributed system resource which the requests are directed to is unavailable, in some embodiments. For example, some requests may not need access to the system resource in order to service the request. While other requests that may need access to the system resource may be acknowledged, and performed when the system resource becomes available. FIG. 8 is a high-level flowchart illustrating various methods and techniques for servicing requests at resource control nodes in a logical control group included in a different availability zone than an availability zone including the a requested system resource, according to some embodiments.

As indicated at 810, a request may be received at a resource control node included in one availability zone for a system resource that is implemented in a different availability zone. For example, if the system resource is a data volume stored in storage devices included in one availability zone, the service request for the data volume may be received at a resource control node in the logical control group for the data volume that is located in a different availability zone. As indicated by the positive exit from 820, if the different availability zone including the system resource is available, the request may be serviced, as indicated at 860. For instance, if the request is to perform a modification or change to the data volume (in the example given above), the resource control node may send requests, commands, or perform other operations to access the data volume and perform the requested change in the other availability zone.

Availability zones may, as discussed above, be subject to various kinds of failures (e.g., power failures or network partitions) that prevent communication with other computing systems external to the availability zone. These failures may make the computing systems or resources located or hosted in the availability zone unavailable (e.g., for performing service requests). Thus, in some embodiments, service requests for the different availability zone may be serviced dependent on whether access to the resource is required in order to complete the request. For example, requests may be formatted according to an application programming interface (API) for the distributed system. Each request may indicate components of the system resource that may need to be available in order to complete the request (e.g., reference IDs identifying particular components may indicate the particular availability zone in which the component is located). Requests may also designate a type (e.g., whether they are zonal or regional), in some embodiments. A particular type of API request (e.g., regional) may be serviceable whether the availability zone that hosts the requested system resource is available or not. As indicated by the negative exit from 822, if access to the system resource is not required, then the request may be serviced, as indicated at 860, even though the resource may not currently be available.

However, in some embodiments, requests may need to access the system resource in order to complete the service request. For example, a change or modification to the system resource may include configuring the resource at the local system implementing the resource. As indicated by the positive exit from 822, a request that may require access may be recorded, as indicated at 830. In some embodiments, a database, or other data store, may be configured to store the requests, or the intentions of requests (e.g., include descriptive, or other information pertaining to the completion of the request) in order to perform the request at a later time, such as when the system resource becomes available. Multiple requests for a system resource that is unavailable may be stored and, in some embodiments, may be replayed according to a sequence order (e.g., the order in which they are received or a priority order). Requests may, in some embodiments, be recorded in such a way as to supersede, override, or otherwise replace a previously recorded request.

Once the request is recorded, the request may be acknowledged as recorded, as indicated at 840, in some embodiments. For example, if a client requests that a data object be deleted, an acknowledgment may be sent to the client acknowledging the delete request and indicating that it will be performed. In some embodiments, a client or other system sending the request may be unaware that the system resource is in an availability zone that is unavailable, preventing access to the system resource which may not be available. For instance, the request may be acknowledged within a same or similar timeframe as acknowledging the request within an established or predetermined amount of time for completing requests (e.g., as may be indicated in a service level agreement guaranteed to a customer). In this way, the request to the system resource may appear, from the point of view of a client of the distributed system (e.g., a customer of a network-based service), to be handled as if the system resource may be hosted in many different availability zones—even if it is only resides in a particular availability zone.

When the system resource becomes available (e.g., when the availability zone including the system resource becomes available again), the request may be serviced as indicated in the recording for the request, as indicated at 850. For instance, any information describing the request may be used to execute, perform, or complete the request with regard to the system resource (e.g., changing the performance characteristics of the system resource according to the parameters recorded for the request). As noted above, in some embodiments, multiple requests for a distributed system resource may be recorded, and thus the record requests may be completed in a particular order or sequence (e.g., in the order that requests are received, last in first out (LIFO), or a priority ordering).

The methods described herein may in various embodiments be implemented by any combination of hardware and software. For example, in one embodiment, the methods may be implemented by one or more computer systems (e.g., a computer system as in FIG. 9) that include one or more processors executing program instructions stored on a computer-readable storage medium coupled to the processors. The program instructions may be configured to implement the functionality described herein (e.g., the functionality of various tiers, servers, nodes, resources, and/or other components, such as those that implement the network-based services described herein). The various methods as illustrated in the figures and described herein represent example embodiments of methods. The order of any method may be changed, and various elements may be added, reordered, combined, omitted, modified, etc.

Figure 9:
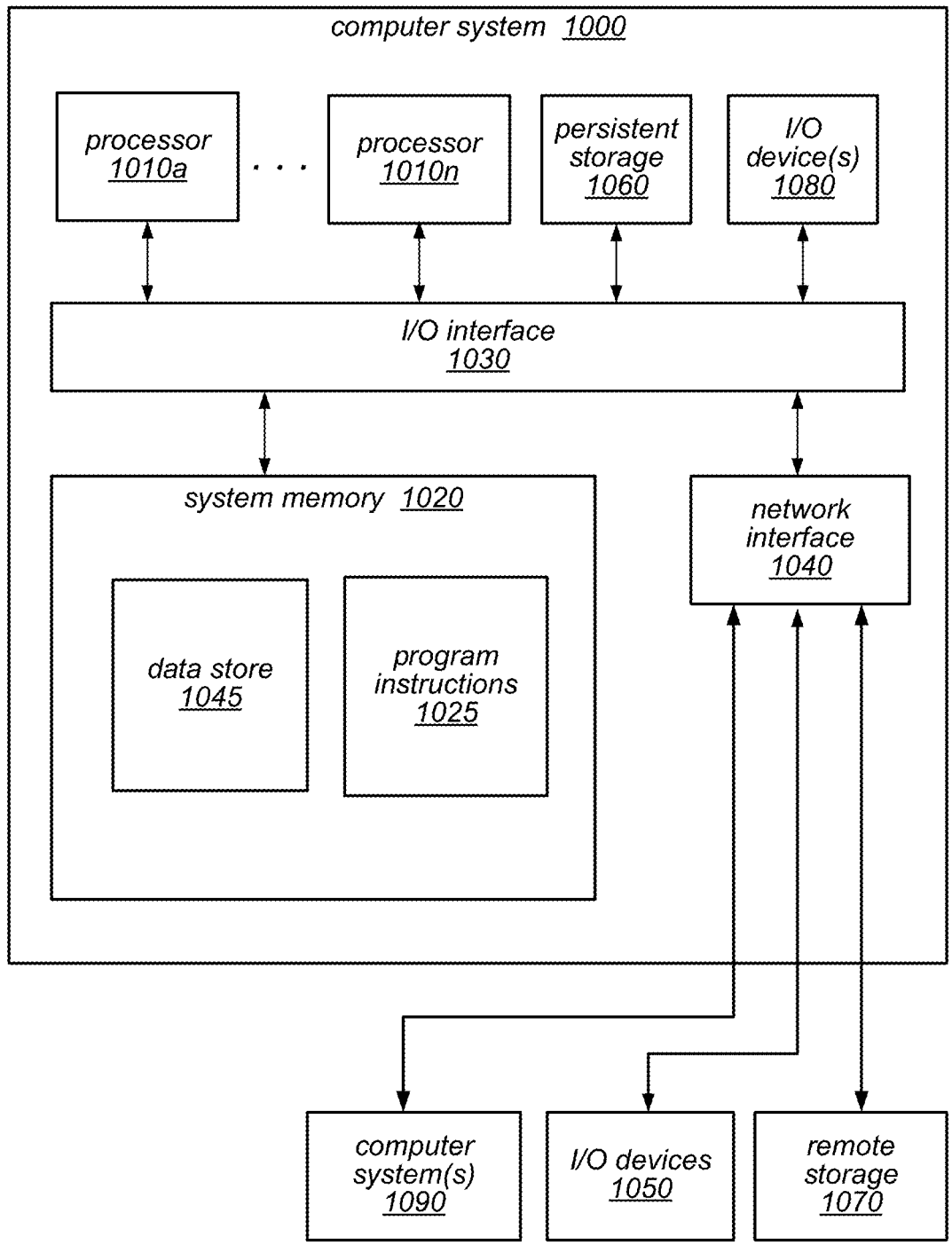
FIG. 9 is a block diagram illustrating an example computing system, according to some embodiments.

Embodiments of logical control groups for distributed system resources as described herein may be executed on one or more computer systems, which may interact with various other devices. FIG. 9 is a block diagram illustrating an example computer system, according to various embodiments. For example, computer system 1000 may be configured to implement storage and/or compute nodes of a compute cluster, a data stores, and/or a client, in different embodiments. Computer system 1000 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

Computer system 1000 includes one or more processors 1010 (any of which may include multiple cores, which may be single or multi-threaded) coupled to a system memory 1020 via an input/output (I/O) interface 1030. Computer system 1000 further includes a network interface 1040 coupled to I/O interface 1030. In various embodiments, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA. The computer system 1000 also includes one or more network communication devices (e.g., network interface 1040) for communicating with other systems and/or components over a communications network (e.g. Internet, LAN, etc.).

In the illustrated embodiment, computer system 1000 also includes one or more persistent storage devices 1060 and/or one or more I/O devices 1080. In various embodiments, persistent storage devices 1060 may correspond to disk drives, tape drives, solid state memory, other mass storage devices, block-based storage devices, or any other persistent storage device. Computer system 1000 (or a distributed application or operating system operating thereon) may store instructions and/or data in persistent storage devices 1060, as desired, and may retrieve the stored instruction and/or data as needed. For example, in some embodiments, computer system 1000 may host a storage node or other resource node, and persistent storage 1060 may include the SSDs attached to that resource node.

Computer system 1000 includes one or more system memories 1020 that are configured to store instructions and data accessible by processor(s) 1010. In various embodiments, system memories 1020 may be implemented using any suitable memory technology, (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory).

System memory 1020 may contain program instructions 1025 that are executable by processor(s) 1010 to implement the methods and techniques described herein. In various embodiments, program instructions 1025 may be encoded in platform native binary, any interpreted language such as Java™ byte-code, or in any other language such as C/C++, Java™, etc., or in any combination thereof. For example, in the illustrated embodiment, program instructions 1025 include program instructions executable to implement the functionality of a node, in different embodiments. In some embodiments, program instructions 1025 may implement multiple separate clients, nodes, and/or other components.

In some embodiments, program instructions 1025 may include instructions executable to implement an operating system (not shown), which may be any of various operating systems, such as UNIX, LINUX, Solaris™, MacOS™, Windows™, etc. Any or all of program instructions 1025 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 1000 via I/O interface 1030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 1000 as system memory 1020 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 1040.

In some embodiments, system memory 1020 may include data store 1045, which may be configured as described herein. In general, system memory 1020 (e.g., data store 1045 within system memory 1020), persistent storage 1060, and/or remote storage 1070 may store data blocks, replicas of data blocks, metadata associated with data blocks and/or their state, configuration information, and/or any other information usable in implementing the methods and techniques described herein.

In one embodiment, I/O interface 1030 may be configured to coordinate I/O traffic between processor 1010, system memory 1020 and any peripheral devices in the system, including through network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments, some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems 1090, for example. In addition, network interface 1040 may be configured to allow communication between computer system 1000 and various I/O devices 1050 and/or remote storage 1070. Input/output devices 1050 may, in some embodiments, include one or more display terminals, keyboards, keypads, touchpads, scanning devices, voice or optical recognition devices, or any other devices suitable for entering or retrieving data by one or more computer systems 1000. Multiple input/output devices 1050 may be present in computer system 1000 or may be distributed on various nodes of a distributed system that includes computer system 1000. In some embodiments, similar input/output devices may be separate from computer system 1000 and may interact with one or more nodes of a distributed system that includes computer system 1000 through a wired or wireless connection, such as over network interface 1040. Network interface 1040 may commonly support one or more wireless networking protocols (e.g., Wi-Fi/IEEE 802.11, or another wireless networking standard). However, in various embodiments, network interface 1040 may support communication via any suitable wired or wireless general data networks, such as other types of Ethernet networks, for example. Additionally, network interface 1040 may support communication via telecommunications/telephony networks such as analog voice networks or digital fiber communications networks, via storage area networks such as Fibre Channel SANs, or via any other suitable type of network and/or protocol. In various embodiments, computer system 1000 may include more, fewer, or different components than those illustrated in FIG. 9 (e.g., displays, video cards, audio cards, peripheral devices, other network interfaces such as an ATM interface, an Ethernet interface, a Frame Relay interface, etc.)

It is noted that any of the distributed system embodiments described herein, or any of their components, may be implemented as one or more network-based services. For example, a compute cluster within a computing service may present computing and/or storage services and/or other types of services that employ the distributed computing systems described herein to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the network-based service in a manner prescribed by the description of the network-based service's interface. For example, the network-based service may define various operations that other systems may invoke, and may define a particular application programming interface (API) to which other systems may be expected to conform when requesting the various operations. though In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the network-based service, using an Internet-based application layer transfer protocol such as Hypertext Transfer Protocol (HTTP).

In some embodiments, network-based services may be implemented using Representational State Transfer ("RESTful") techniques rather than message-based techniques. For example, a network-based service implemented according to a RESTful technique may be invoked through parameters included within an HTTP method such as PUT, GET, or DELETE, rather than encapsulated within a SOAP message.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:

1. A system, comprising:
    a plurality of computing nodes each included in a respective one of a plurality of different availability zones, wherein each computing node of the plurality of computing nodes is implemented on a respective computing device;
    the plurality of computing nodes, configured to implement:
        a resource tier, configured to maintain a plurality of system resources;
        a resource control tier, comprising a plurality of logical control groups that each include a respective two or more computing nodes of the plurality of computing nodes, wherein for a particular one of the logical control groups, each of the computing nodes of the particular logical control group is configured to service requests for managing a specific system resource of the plurality of system resources corresponding to the respective logical control group, wherein at least one of the respective two or more computing nodes of each of the plurality of logical control groups is included in a different availability zone than an availability zone that includes the corresponding system resource for which the logical control group services requests, and wherein for at least the particular one of the logical control groups at least some of the computing nodes are included in different availability zones with respect to one another;
        a request routing tier, configured to:
            receive a request for managing a particular system resource of the plurality of system resources;
            in response to said request,
                discover one or more computing nodes in the respective logical control group for the particular system resource; and
                send the request to one of the one or more computing nodes to service the request.

2. The system of claim 1, wherein to discover the one or more computing nodes in the respective logical control group for the particular system resource, the request routing tier is configured to access an entry for the particular system resource in a resource control cache indicating computing nodes configured to service requests for the plurality of system resources.

3. The system of claim 1, wherein to discover the one or more computing nodes in the respective logical control group for the particular system resource, the request routing tier is further configured to:
    determine that the entry for the system resource in a resource control cache is empty;
    in response to said determining:
        select one or more computing nodes of a larger collection of computing nodes implementing the resource control tier that are included in different ones of the plurality of availability zones to query for information describing computing nodes configured to service requests for the particular system resource; and
        based, at least in part, on the information received from at least one of the selected one or more computing nodes queried, update the entry in the resource control cache to identify the discovered one or more computing nodes in the respective logical control group for the particular system resource.

4. The system of claim 1, wherein the plurality of computing nodes together implement a network-based service, wherein the plurality of system resources are maintained for one or more clients of the network-based service, and wherein the request is received from a client of the network-based service.

5. A method, comprising:
    performing, by a plurality of computing devices included in different respective ones of a plurality of availability zones, wherein the plurality of computing devices together implement a distributed system:
        receiving, at a request routing tier providing application layer routing for the distributed system, a request for managing a particular system resource maintained in a resource tier of the distributed system;
        in response to receiving said request:
            discovering one or more resource control nodes in a logical control group for the particular system resource, the logical control group implemented in a resource control tier of the distributed system, wherein the logical control group comprises a plurality of resource control nodes including the discovered one or more resource control nodes, the plurality of resource control nodes configured to service requests for managing the particular system resource, wherein at least one of the resource control nodes in the logical control group is included in a different availability zone than an availability zone that includes the particular system resource for which the logical control group services requests, and wherein at least some of the resource control nodes in the logical control group are included in different availability zones with respect to one another; and sending the request received at the request routing tier to one of the resource control nodes to service the request.

6. The method of claim 5, wherein the request is received at the request routing tier from a load balancer.

7. The method of claim 5, wherein the particular system resource is not replicated across one or more of the plurality of availability zones.

8. The method of claim 5, wherein said discovering the one or more resource control nodes in the logical control group implemented in the resource control tier of the distributed system for the particular system resource, comprises:

accessing an entry for the particular system resource in a resource control cache indicating resource control nodes configured to service requests for the resource tier.

9. The method of claim 8, wherein said discovering the one or more resource control nodes in the logical control group implemented in the resource control tier of the distributed system for the particular system resource, further comprises:

determining that the entry for the system resource in the resource control cache is empty;

in response to said determining:

selecting one or more resource control nodes of a larger collection of resource control nodes, including the one or more resource control nodes in the logical control group, of the resource control tier that are included in different ones of the plurality of availability zones, to query for information describing resource control nodes configured to service requests for the particular system resource; and based, at least in part, on the information received from at least one of the selected one or more resource control nodes queried, updating the entry in the resource control cache to identify the one or more resource control nodes in the logical control group for the particular system resource.

10. The method of claim 8, further comprising:

determining that the one resource control node sent the request is unavailable to service the request;

in response to said determining:

selecting one or more resource control nodes of a larger collection of resource control nodes, including the one or more resource control nodes in the logical control group, of the resource control tier that are included in different ones of the plurality of availability zones to query for information describing resource control nodes configured to service requests for the particular system resource; and based, at least in part, on the information received from at least one of the selected one or more resource control nodes queried, updating the entry in the resource control cache to identify the one or more resource control nodes in the respective logical control group for the particular system resource.

11. The method of claim 5, wherein the availability zone including the particular system resource is unavailable, and wherein the one resource control node sent the request is included in a different availability zone than the availability zone that includes the particular system resource.

12. The method of claim 11, further comprising recording, at the one resource control node, the request in order to service the request when the availability zone including the particular system resource becomes available.

13. The method of claim 5, further comprising selecting the one resource control node in the logical control group to send the request from among the one or more resource control nodes discovered in the logical control group for the particular system resource.

14. The method of claim 5, further comprising performing, among a larger collection of resource control nodes, including the one or more resource control nodes in the logical control group, a gossip-based synchronization protocol to synchronize respective metadata describing other resource control nodes maintained at each resource control node of the larger collection of resource control nodes.

15. The method of claim 5, wherein the plurality of computing devices together implement the distributed system as a network-based service, wherein the particular system resource is one of a plurality of system resources that are maintained for one or more clients of the network-based service, and wherein the request is received from a client of the network-based service associated with the particular system resource.

16. A non-transitory, computer-readable storage medium, storing program instructions that when executed by a plurality of computing devices that together implement a distributed system cause the one or more computing devices to implement:

receiving, at a request routing tier of the distributed system, a request for a particular system resource maintained in a resource tier of the distributed system, wherein the particular system resource is one of a plurality of different system resources in the resource tier that are each included in a respective availability zone of a plurality of availability zones;

in response to receiving said request:

discovering one or more resource control nodes in a logical control group for the particular system resource, the logical control group implemented in a resource control tier of the distributed system, wherein the logical control group comprises a plurality of resource control nodes, including the discovered one or more resource control nodes, the plurality of resource control nodes configured to service requests for managing the particular system resource, wherein at least one of the resource control nodes in the logical control group is included in a different availability zone than the respective availability zone that includes the particular system resource for which the logical control group services requests, and wherein at least some of the resource control nodes in the logical control group are included in different availability zones with respect to one another; and sending the request received at the request routing tier to one of the one or more resource control nodes to service the request.

17. The non-transitory, computer-readable storage medium of claim 16, wherein each of the plurality of availability zones provides a respective failure scope such that respective portions of the request routing tier, the resource control tier, and the resource tier included in an availability zone operate irrespective of failures in another availability zone.

18. The non-transitory, computer-readable storage medium of claim 16, wherein in said discovering the one or more resource control nodes in the logical control group for the particular system resource implemented in the resource control tier of the distributed system, the program instructions cause the plurality of computing devices to implement:

accessing an entry for the particular system resource in a resource control cache, the entry indicating resource control nodes configured to service requests for the particular system resource.

19. The non-transitory, computer-readable storage medium of claim 18, wherein in said discovering the one or more resource control nodes in the logical control group for the particular system resource, the program instructions further cause the plurality of computing devices to implement:

determining that the entry for the particular system resource in the resource control cache is empty;

in response to said determining:

selecting one or more resource control nodes of a larger collection of resource control nodes of the resource control tier, including the one or more resource control nodes in the logical control group implemented in different ones of the plurality of availability zones to query for information describing resource control nodes configured to service requests for the particular system resource; and based, at least in part, on the information received from at least one of the selected one or more resource control nodes queried, updating the entry in the resource control cache to identify the one or more resource control nodes in the respective logical control group for the particular system resource.

20. The non-transitory, computer-readable storage medium of claim 16, wherein the respective availability zone including the particular system resource is available, wherein the one resource control node sent the request is implemented in a different availability zone than the respective availability zone that includes the particular system resource, and wherein the program instructions further cause the plurality of computing devices to implement:

performing the service request at the one resource control node with respect to the particular system resource in the respective availability zone.

21. The non-transitory, computer-readable storage medium of claim 16, wherein the program instructions further cause the plurality of computing devices to implement selecting the one resource control node in the logical control group to send the request from among the one or more resource control nodes discovered for the particular system resource.

22. The non-transitory, computer-readable storage medium of claim 16, wherein the program instructions further cause the plurality of computing devices to implement performing, among a larger collection of resource control nodes, including the one or more resource control nodes in the logical control group, that implement the resource control tier, a gossip-based synchronization protocol to synchronize respective metadata describing other resource control nodes maintained at each resource control node of the larger collection of resource control nodes.

23. The non-transitory, computer-readable storage medium of claim 16, wherein the plurality of computing nodes together implement a network-based, block-based storage service, wherein the particular system resource is a one of a plurality of data volumes that are maintained for one or more clients of the network-based, block-based storage service, and wherein the request is received from a client of the network-based, block-based storage service associated with the data volume.

* * * * *